(12) United States Patent
Qiu et al.

(10) Patent No.: US 8,477,806 B2
(45) Date of Patent: *Jul. 2, 2013

(54) METHOD AND SYSTEM FOR TRANSMISSION CONTROL PACKET (TCP) SEGMENTATION OFFLOAD

(75) Inventors: Jack Qiu, San Jose, CA (US); Jonathan Lee, Dublin, CA (US)

(73) Assignee: Broadcom Corporation, Irvine, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 12/984,087

(22) Filed: Jan. 4, 2011

(65) Prior Publication Data

US 2011/0158256 A1 Jun. 30, 2011

Related U.S. Application Data

(63) Continuation of application No. 10/752,336, filed on Jan. 6, 2004, now Pat. No. 7,864,806.

(51) Int. Cl.
*H04J 3/24* (2006.01)
(52) U.S. Cl.
USPC .......................................... 370/474; 709/250
(58) Field of Classification Search
USPC .................. 370/469–473, 474, 476; 712/225, 712/229; 709/212, 250; 710/22–28
See application file for complete search history.

(56) References Cited

U.S. PATENT DOCUMENTS

| | | | |
|---|---|---|---|
| 5,805,927 A | 9/1998 | Bowes et al. | |
| 5,937,169 A | 8/1999 | Connery et al. | |
| 5,964,853 A | 10/1999 | Falik et al. | |
| 6,564,267 B1 | 5/2003 | Lindsay | |
| 6,874,054 B2 | 3/2005 | Clayton et al. | |
| 7,046,686 B1 * | 5/2006 | Tompkins et al. | 710/22 |
| 7,613,109 B2 * | 11/2009 | Jha et al. | 709/250 |
| 7,636,372 B2 * | 12/2009 | Fan et al. | 370/469 |
| 2002/0062333 A1 | 5/2002 | Anand et al. | |
| 2002/0095519 A1 | 7/2002 | Philbrick et al. | |
| 2002/0156927 A1 | 10/2002 | Boucher et al. | |
| 2003/0231657 A1 * | 12/2003 | Poon et al. | 370/469 |
| 2003/0231659 A1 * | 12/2003 | DiMambro et al. | 370/473 |
| 2004/0042483 A1 | 3/2004 | Elzur et al. | |
| 2004/0062275 A1 | 4/2004 | Siddabathuni | |
| 2004/0083308 A1 | 4/2004 | Sebastian et al. | |
| 2004/0117496 A1 | 6/2004 | Mittal et al. | |
| 2005/0165980 A1 | 7/2005 | Clayton et al. | |
| 2005/0216597 A1 | 9/2005 | Shah et al. | |

* cited by examiner

*Primary Examiner* — Jeffrey M Rutkowski
(74) *Attorney, Agent, or Firm* — Thomas | Horstemeyer, LLP

(57) ABSTRACT

A method for processing packets includes performing by a plurality of processors integrated in a single NIC chip, the plurality of processors including at least a hardware processor and a firmware processor, receiving information identifying at least one packet to be processed. The method may include determining whether the identified packet is a large send offload packet. If the identified packet is a large send offload packet, the method may include selecting between at least the hardware processor and the firmware processor to process the large send offload packet. If the identified packet is not a large send offload packet, the method may include bypassing the hardware process and the firmware process, and read DMA processing the identified packet from a host memory.

20 Claims, 7 Drawing Sheets

METHOD AND SYSTEM FOR TRANSMISSION CONTROL PACKET (TCP) SEGMENTATION OFFLOAD

CROSS-REFERENCE TO RELATED APPLICATIONS/INCORPORATION BY REFERENCE

This application is a continuation of U.S. application Ser. No. 10/752,336 filed Jan. 6, 2004.

FIELD OF THE INVENTION

Certain embodiments of the invention relate to transmission control packets (TCP). More specifically, certain embodiments of the invention relate to a method and system for TCP segmentation offload.

BACKGROUND OF THE INVENTION

The initial development of transmission control protocol (TCP) was based on networking and processing capabilities that were then currently available. As a result, various fundamental assumptions regarding its operation were prefaced on networking and processor technologies that existed at that time. Among the assumptions on which TCP was prefaced includes the scarcity and high cost of bandwidth and the partially limitless processing resources available by a host processor. With the advent of technologies such as Gigabit Ethernet (GbE), these fundamental assumptions have radically changed to the point where bandwidth is no longer as scarce and expensive and the host processing resources are now regarded a being limited rather than virtually infinite. In this regard, the bottleneck has shifted from the network bandwidth to the host processing bandwidth. Since host processing systems do more than merely providing faster network connections, shifting network resources to provide much faster network connections will do little to address the fundamental change in assumptions. Notably, shifting network resources to provide much faster network connections would occur at the expense of executing system applications, thereby resulting in degradation of system performance.

Although new networking architectures and protocols could be created to address the fundamental shift in assumptions, the new architectures and protocols would still have to provide support for current and legacy systems. Accordingly, solutions are required to address the shift in assumptions and to alleviate any bottlenecks that may result with host processing systems. A transmission control protocol offload engine (TOE) may be utilized to redistribute TCP processing from the host system onto specialized processors which may have suitable software for handling TCP processing. The TCP offload engines may be configured to implement various TCP algorithms for handling faster network connections, thereby allowing host system processing resources to be allocated or reallocated to application processing.

In order to alleviate the consumption of host resources, a TCP connection can be offloaded from a host to a dedicated TCP/IP offload engine (TOE). Some of these host resources may include CPU cycles and subsystem memory bandwidth. During the offload process, TCP connection state information is offloaded from the host, for example from a host software stack, to the TOE. A TCP connection can be in any one of a plurality of states at a given time. To process the TCP connection, TCP software may be adapted to manage various TCP defined states. Being able to manage the various TCP defined states may require a high level of architectural complexity in the TOE.

Offloading state information utilized for processing a TCP connection to the TOE may not necessarily be the best solution because many of the states such as CLOSING, LAST_ACK and FIN_WAIT_2 may not be performance sensitive. Furthermore, many of these non-performance sensitive states may consume substantial processing resources to handle, for example, error conditions and potentially malicious attacks. These are but some of the factors that substantially increase the cost of building and designing the TOE. In addition, a TOE that has control, transferred from the host, of all the state variables of a TCP connection may be quite complex, can use considerable processing power and may require and consume a lot of TOE onboard-memory. Moreover, the TCP connection offloaded to the TOE that has control, transferred from the host, of all the state variables of the TCP connection can be inflexible and susceptible to connection loss.

TCP segmentation is a technology that may permit a very small portion of TCP processing to be offloaded to a network interface card (NIC). In this regard, a NIC that supports TCP segmentation does not truly incorporate a full transmission control processing offload engine. Rather, a NIC that supports TCP segmentation only has the capability to segment outbound TCP blocks into packets having a size equivalent to that which the physical medium supports. Each of the outbound TCP blocks is smaller than a permissible TCP window size. For example, an Ethernet network interface card that supports TCP Segmentation, may segment a 4 KB block of TCP data into 3 Ethernet packets. The maximum size of an Ethernet packet is 1518 bytes inclusive of header and a trailing CRC.

A device that supports TCP segmentation does track certain TCP state information such as the TCP sequence number that is related to the data that the offload NIC is segmenting. However, the device that supports TCP segmentation does not track any state information that is related to inbound traffic, or any state information that is required to support TCP acknowledgements or flow control. A NIC that supports full TCP offload in the established state is responsible for handling TCP flow control, and responsible for handling incoming TCP acknowledgements, and generating outbound TCP acknowledgements for incoming data.

TCP segmentation may be viewed as a subset of TCP offload. TCP segmentation allows the protocol stack or operating system to pass information in the form of blocks of TCP data that has not been segmented into individual TCP packets to a device driver. The block of data may be greater than the size of an Ethernet packet. For instance, the block of data to be segmented could be 4 Kbytes or 16 Kbytes. A network adapter associated with the device driver may acquire the blocks of TCP data, packetize the acquired blocks of TCP data into 1518-byte Ethernet packets and update certain fields in each incrementally created packet. For example, the network adapter may update a corresponding TCP sequence number for each of the TCP packets by incrementing the TCP sequence number for each of the packets. In another example, an IP identification (IP ID) field and flag field would also have to be updated for each packet. One limitation with TCP segmentation is that TCP segmentation may only be done on a block of data that is less than a TCP window size. This is due to the fact that a device implementing TCP segmentation has no influence over TCP flow control. Accordingly, the device implementing TCP flow control only segments outbound TCP packets.

A TCP segmentation device does not examine incoming packets and as such, has no influence over flow control. Any received acknowledgement packet is passed up to the host for processing. In this regard, acknowledgement packets that are utilized for flow control are not processed by the TCP segmentation device. Moreover, a TCP segmentation device does not perform congestion control or "slow-start" and does not calculate or modify any variables that are passed back to the operating system and/or host system processor.

Another limitation with TCP segmentation is that information tracked by TCP segmentation is only information that is pertinent for the lifetime of the TCP data. In this regard, for example, the TCP segmentation device may track TCP segmentation numbers but not TCP acknowledgement (ACK) numbers. Accordingly, the TCP segmentation device tracks only a minimal subset of information related to corresponding TCP data. This limits the capability and/or functionality of the TCP segmentation device. A further limitation with TCP segmentation is that a TCP segmentation device does not pass TCP processed information back to an operating system and/or host processor. This lack of feedback limits the TCP processing that otherwise may be achieved by an operating system and/or host system processor.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain aspects of the invention may be found in a method and system for packet segmentation and offload. Aspects of the method for packet segmentation and offload may comprise receiving information identifying at least one packet to be processed and determining whether an identified packet is a large send offload packet. If the identified packet is a large send offload packet, a selection may be made between a hardware process and a firmware process for handling the large send offload packet. The large send offload packet may then be processed by the selected hardware process or firmware process. The information identifying at least one packet to be processed may be, for example, a send buffer descriptor.

If the identified packet is not a large send offload packet, the hardware process and/or the firmware process may be bypassed and the packet may be read DMA processed from a host memory. At least one checksum may be computed for the identified packet in hardware during read DMA processing. The method may further comprise generating at least one header for packet segments corresponding to the large send offload packet in the hardware during the read DMA processing. At least one checksum may also be computed for the identified packet in firmware during send data complete processing. In another aspect of the invention, at least one header for packet segments corresponding to the large send offload packet may be generated in firmware during send data complete processing.

At least a portion of protocol header information for a first segment of the large send offload packet may be stored and subsequently utilized for at least a header portion of a second segment of the large send offload packet. A payload corresponding to the second segment of the large send offload packet may be placed at a determined offset within a transmit buffer for the second segment. Accordingly, a header portion of the second segment may then be created based on at least a header portion of a previous segment.

Another embodiment of the invention may provide a machine-readable storage, having stored thereon, a computer program having at least one code section for packet segmentation and offload. The at least one code section may be executable by a machine, thereby causing the machine to perform the steps as described above for packet segmentation and offload.

Certain aspects of the system for packet segmentation and offload may comprise a send data initiator that receives information identifying at least one packet to be processed and at least one of an internal CPU and/or the send data initiator may determine whether an identified packet is a large send offload packet. If the identified packet is a large send offload packet, at least one selector may select between a hardware process and a firmware process for handling the large send offload packet. The processor may be adapted to process the large send offload packet by the selected hardware process and/or the firmware process. The selector may further allow bypassing of the hardware process and/or the firmware process, and the processor may read DMA process the identified packet from a host memory if the identified packet is not a large send offload packet. The processor may comprise at least one of a read DMA engine, a read DMA post-processor, and internal CPU and a send data complete module.

The processor may compute at least one checksum for the identified packet in hardware during read DMA processing. At least one header may be generated by the processor for packet segments corresponding to the large send offload packet in hardware during the read DMA processing. The processor may also compute at least one checksum for the identified packet in firmware during send data complete processing. At least one header for packet segments corresponding to the large send offload packet may be generated in firmware under control of the processor during the send data complete processing.

The processor may be adapted to store at least a portion of protocol header information for a first segment of the large send offload packet. At least a portion of the stored protocol header information may be utilized or reused for at least a portion of the second segment of the large send offload packet. A payload corresponding to the second segment of the large send offload packet may be placed in a transmit buffer at a determined offset within a transmit buffer for the second segment. Accordingly, the processor may create a header portion of the second segment based on at least a header portion of a previous segment.

In another embodiment of the invention, a system for packet segmentation and offload may comprise a read DMA processor, an internal CPU coupled to the read DMA processor, a memory arbiter coupled to the read DMA processor, a transmit buffer memory coupled to the read DMA processor, a send data initiator coupled to the read DMA processor, a send data complete module coupled to the read DMA processor, and a bus interface coupled to the read DMA processor. The bus interface may be at least one of a PCI, PCI-X and PCI Express bus interface. The read DMA processor, internal CPU, memory arbiter, transmit buffer memory, send data initiator, send data complete module and bus interface may integrated within a single chip or may be integrated on a network interface card. A host system such as a host computer may be coupled to the bus interface.

These and other advantages, aspects and novel features of the present invention, as well as details of an illustrated embodiment thereof, will be more fully understood from the following description and drawings.

DETAILED DESCRIPTION OF THE INVENTION

Aspects of the present invention may be found in a method and system for improving performance of a network computing device that may be adapted for TCP segmentation offload. In this regard, the system and method may provide an effective and efficient approach to segmenting TCP packets that are identified as large send offload (LSO) packets. TCP segmentation of the large send offload packets may be performed in any combination of hardware, software and/or firmware. The hardware, software and/or firmware may effectively communicate with a control processor and/or central processing unit (CPU) in order to access packets such as the LSO packets, via a bus interface such as a peripheral connect interface (PCI), PCI-X or PCI Express bus.

Figure 1:
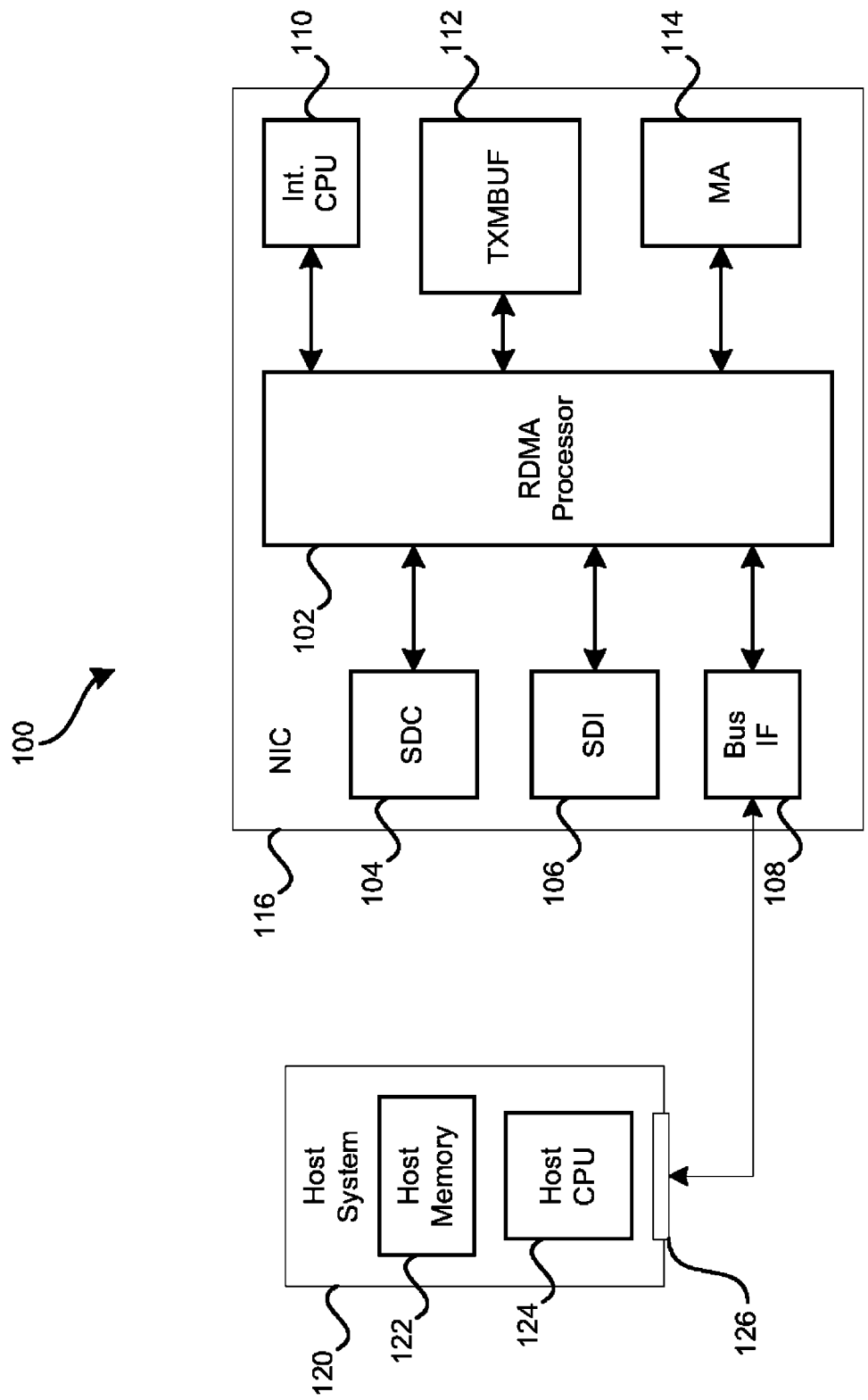
FIG. 1 is block diagram of an exemplary system that may be utilized in connection with TCP segmentation offload for processing segmentation requests in accordance with an embodiment.

FIG. 1 is block diagram of an exemplary system 100 that may be utilized in connection with TCP segmentation offload for processing segmentation requests in accordance with an embodiment. Referring to FIG. 1, there is shown a read direct memory access (RDMA) processor 102, a send data complete (SDC) module 104, a send data initiator (SDI) processor 106, a bus interface (IF) 108, a CPU 110, a transmit buffer (TXM-BUF) module 112 and a memory arbiter or arbitration (MA) module 114. At least one or more of the read direct memory access (RDMA) processor 102, send data complete (SDC) module 104, send data initiator (SDI) processor 106, bus interface 108, CPU 110, a transmit buffer (TXMBUF) module 112 and the memory arbiter (MA) or arbitration module 114 may be located in hardware incorporated in one or more integrated circuits located on a network interface card (NIC). The bus interface 108 may be, for example, a PCI, PCI-X or PCI Express standardized bus interface.

FIG. 1 also illustrates a host system 120 comprising a host memory 122, a host CPU 124 and a host bus interface 126. The host bus interface 126 may be, for example, a PCI, PCI-X or PCI Express standardized bus interface. Accordingly, the host system 120 may be coupled to the network interface card 116 via the bus interfaces 126, 108, respectively. The host system 120 may be, for example, a computer system, server or network node. In this regard, the network interface card 116 may be a plug-in card that may be plugged into the PCI, PCI-X or PCI Express slot 126 of the host system 120. In the case where the bus interface 108 is a PCI Express bus, then a bridge or adapter may be required to interface a PCI or PCI-X device to the PCI Express bus 108. Accordingly, using the bridge or adapter, the backward software compatibility of PCI Express may therefore be utilized to facilitate communication with a PCI or PCI-X interconnected device.

The read direct access memory (RDMA) processor 102 may be a specialized DMA processor that may be adapted to facilitate the segmentation and offload of data such as TCP/IP data from a host system onto a network interface card (NIC) for processing. This may advantageously free up host CPU resources that may otherwise be spent for network processing.

The send data complete (SDC) module 104 may comprise suitable logic, circuitry and/or memory circuits that may be adapted to process data provided by the read direct access memory processor 102 in order to generate one or more address pointers that are utilized to indicate the start of one or more packets or frames.

The send data initiator (SDI) module 106 may comprise suitable logic, circuitry and/or memory circuits that may be adapted to facilitate the acquisition of buffers that are utilized to transfer data between the host system 120 and the network interface card 116. In this regard, the send data initiator module 106 may be adapted to fetch at least one buffer descriptor for at least one corresponding data buffer in the host memory 122 from a pool of frame buffer descriptors that may be stored in a miscellaneous buffer descriptor memory, for example.

The bus interface 108 may be a standardized bus interface that may be adapted to facilitate communication between the network interface card 116 and the host system 120. In this regard, the bus interface 108 may be PCI, PCI-X or PCIX compliant bus interface.

The internal (INT) CPU 110 may be any microprocessor or microcontroller that may be adapted to control at least some of the operations of the read direct memory access processor 102 and communication with the host system 120. In an embodiment of the invention, for example, the internal CPU 110 may be adapted to assist in controlling whether firmware controlled segmentation offload should be utilized or whether software segmentation offload should be utilized. The transmit buffer module 112 is an internal NIC memory that may be adapted to host the transmit buffer descriptors that may be utilized to control the offload segmentation.

The memory arbiter or memory arbitration module 114 can be any standard or specialized memory arbiter that may be utilized to grant, deny and/or resolve any conflicts that may occur for memory accesses. For example, with reference to FIG. 1, the host CPU 124, the host bus interface 126, internal CPU 110, the RDMA processor 102 or any combination thereof, may attempt to access the transmit memory buffer (TXMBUF) 112 at the same time, thereby resulting in a conflict. Accordingly, the memory arbitrator 114 may be configured to utilize an arbitration mechanism such as an priority arbitration scheme to resolve the conflicting accesses.

In general, the send data initiator module 106 may be adapted to facilitate the segmentation of large send offload TCP packets received from the host memory 124 of the host memory 120. However, the invention is not limited to the segmentation and offload of large send offloaded TCP packets, but other non-LSO TCP packets may also be segmented and offload. Notwithstanding, the LSO packets may be transmitted by way of a PCI bus within the computing device. In operation, the send data initiator module 106 may be adapted to communicate with the CPU 110 via the read direct memory access processor 102 whenever TCP data is to be offloaded. In this regard, the send data initiator module 106 may send a DMA read request to the RDMA processor 102 in order to obtain at least one buffer descriptor (BD) from a pool of frame buffer descriptors. The pool of frame buffer descriptors may be located and handled in the MISC_BD memory 112 (FIG. 2). The miscellaneous buffer descriptor memory 112 may be adapted to store descriptive information regarding one or more packets or frames that are to be segmented.

Figure 2A:
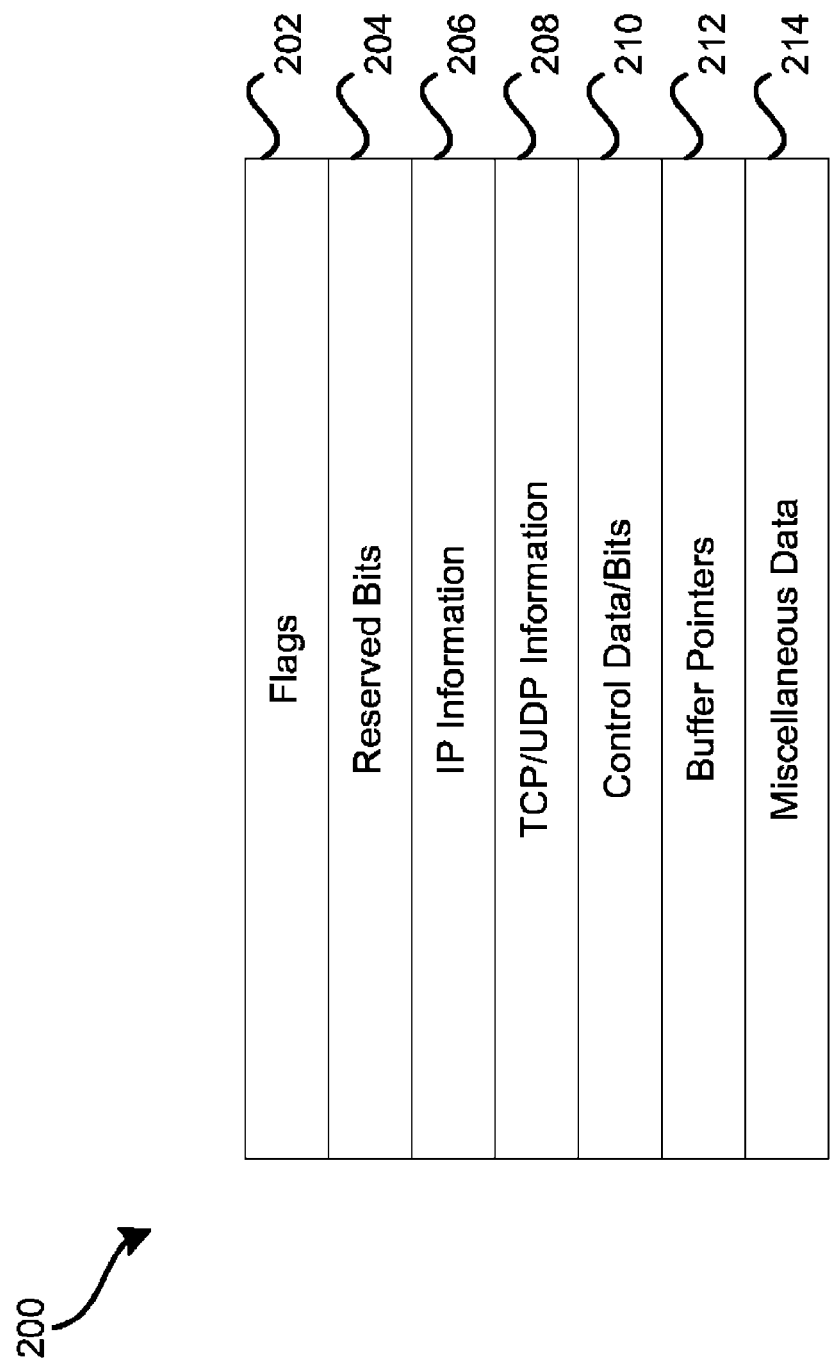
FIG. 2A is a block diagram illustrating an exemplary transmit buffer descriptor in accordance with an embodiment of the invention.

FIG. 2A is a block diagram illustrating an exemplary transmit buffer descriptor 200 in accordance with an embodiment of the invention. Referring to FIG. 2, the exemplary buffer descriptor 200 may comprise at least one flags field 202, at least one optional reserved bit field 204, at least one IP information field 206, at least one TCP/UDP information field 208, at least one control data/bit field 210, a plurality of buffer pointers or other address identifiers 212, and/or other miscellaneous data fields 214.

The various fields in the exemplary frame descriptor 200 may be placed in any suitable arrangement. The width and length of the exemplary buffer descriptor 200 may be implementation dependent and may also depend on a size of the transmit buffer (TXMBUF) 112. In an illustrative exemplary embodiment of the invention, the transmit buffer (TXMBUF) 112 may be thirty-two (32) bits wide and may contain 128 bytes.

The flags field 202, the control data/bit field 210 and/or the miscellaneous data field bits 214 may be utilized to indicate, for example, any one or more of the following: whether a buffer represents a segmented packet, whether a buffer is the first or last buffer in a segmented packet and whether a packet is a large send offload packet. The flags field 202, the control data/bit field 210 and/or the miscellaneous data field bits 214 may also comprise a length of a buffer, a previous buffer, a next buffer, a tail of a buffer, the head of a buffer, a state of segmented packets, received control packet information, and/or status and control information. Other control/data bits may include, but are not limited to, at least one bit that may be utilized to indicate whether or not a frame may require post-processing.

The reserved bits field 204 may comprise a plurality of bits that may be utilized to future use or may be utilized for byte alignment. The IP information field 206 may comprise information such as pointers to the start and/or end of IP data. The IP information field 206 may also include IP checksum information, whether pseudo or actual. The TCP/UDP information field 206 may comprise information such as pointers to the start of TCP/UDP header information, various identifiers and checksum information. The checksum information may comprise TCP/UDP checksum information and/or checksum status information.

The buffer pointers field 214 may comprise various pointer or other memory address location identifiers to various memory locations containing TCP, IP and/or UDP information, for example. In an embodiment of the invention, the buffer pointers field 212 may contain pointers to other buffer descriptors. In this regard, two or more buffer descriptors may be linked in a daisy chain manner.

Figure 2B:
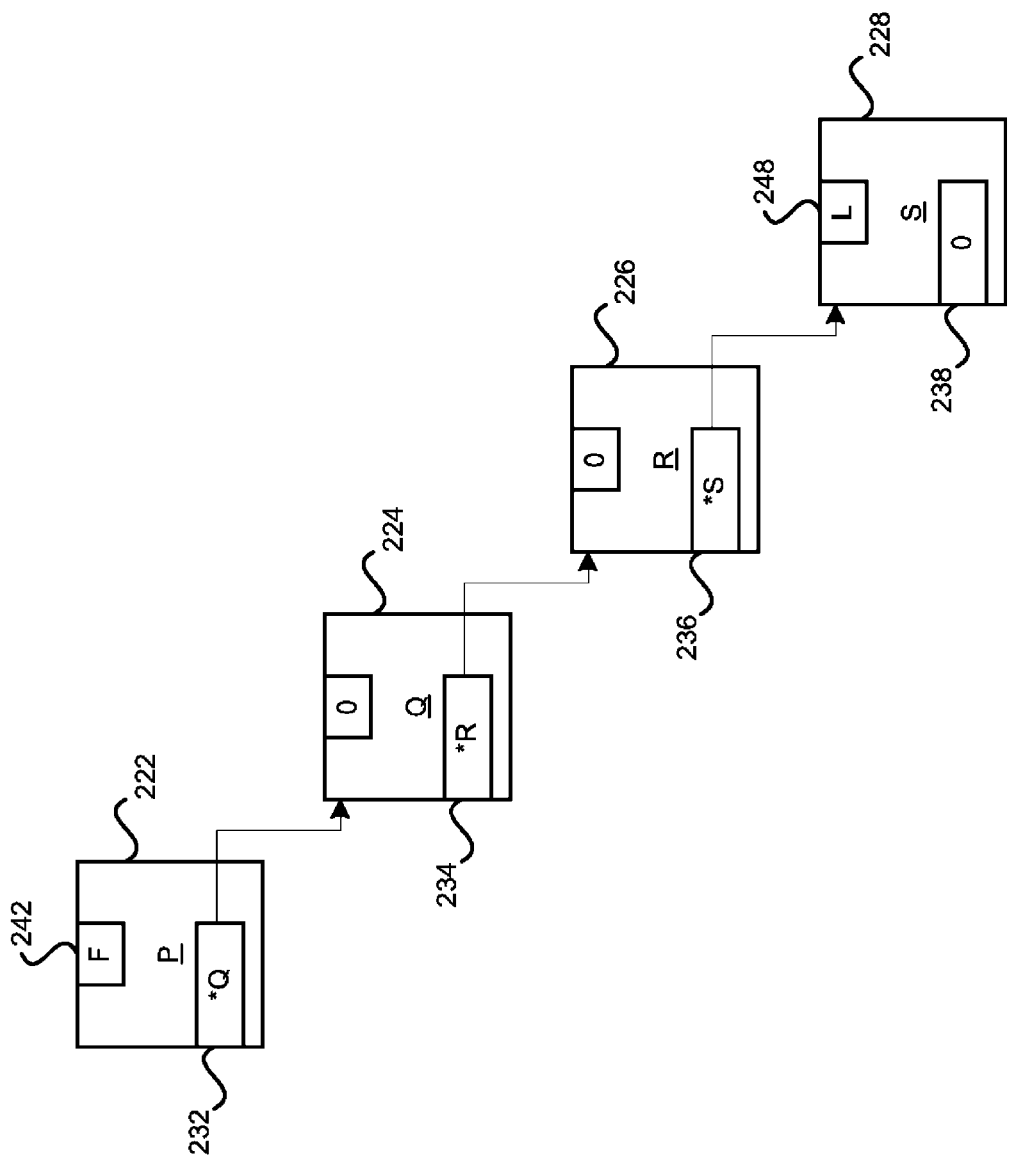
FIG. 2B is a block diagram illustrating daisy chaining of buffer descriptors utilized for TCP segmentation offload in accordance with an embodiment of the invention.

FIG. 2B is a block diagram illustrating daisy chaining of buffer descriptors utilized for TCP segmentation offload in accordance with an embodiment of the invention. Referring to FIG. 2B, there is shown a first transmit buffer descriptor P 222, a second transmit buffer descriptor Q 224, a third transmit buffer descriptor R 226 and a fourth transmit buffer descriptor S 228. The first transmit buffer descriptor P 222 may include a next buffer field 232 which utilizes pointer *Q to point to the start of transmit buffer descriptor Q 224. The second transmit buffer descriptor Q 224 may include a next buffer field 234 which utilizes pointer *R to point to the start of transmit buffer descriptor R 226. The third transmit buffer descriptor R 226 may include a next buffer field 236 which utilizes pointer *S to point to the start of transmit buffer descriptor S 228. Accordingly, transmit buffer descriptor Q 224 is chained to transmit buffer descriptor P 222, transmit buffer descriptor R 226 is chained to transmit buffer descriptor Q 224 and transmit buffer descriptor S 228 is chained to transmit buffer descriptor R 226. The first transmit buffer descriptor P 202 may further comprise at least one bit field F 242 that may be utilized to indicate that the transmit buffer descriptor P 202 is the first of the chained transmit buffer descriptor. Additionally, the last transmit buffer descriptor S 228 may further comprise at least one bit field L 248 that may be utilized to indicate that the transmit buffer descriptor P 228 is the last of the chained transmit buffer descriptor.

A frame descriptor (FD) may be utilized to define a particular frame and may include a plurality of transmit buffer descriptors that are utilized to characterize that frame. The size of a frame descriptor may be implementation dependent. In one embodiment, the frame descriptor (FD) may comprise 40 bytes. The frame buffer descriptor may be represented in software by a data structure or other arrangement.

Figure 3A:
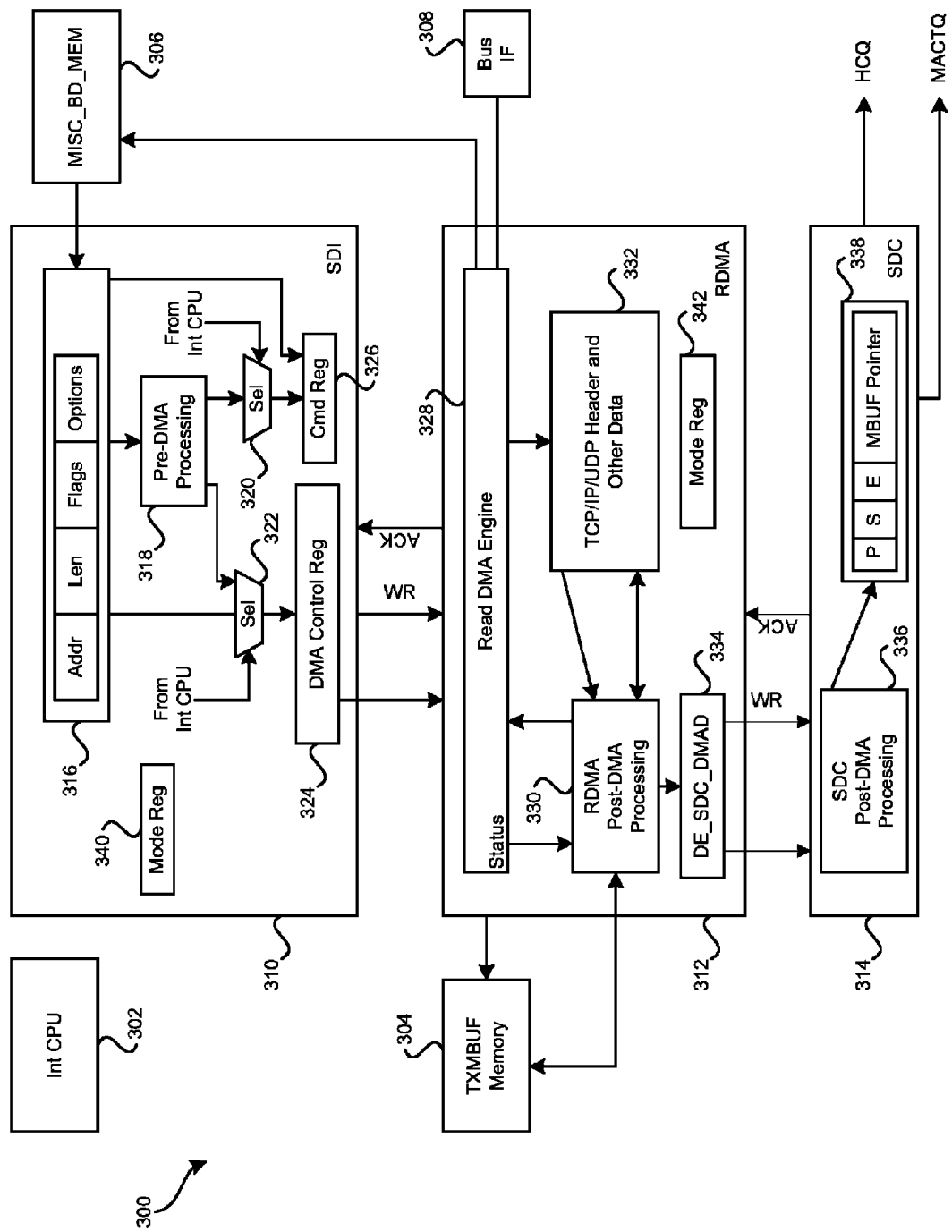
FIG. 3A illustrates a block diagram of a system that may be utilized to perform segmentation of large send packets in accordance with an embodiment of the invention.

FIG. 3A illustrates a block diagram of a system 300 that may be utilized to perform segmentation of large send packets in accordance with an embodiment of the invention. Referring to FIG. 3A, the system 300 may comprise an internal CPU 302, a transmit buffer memory 304, a miscellaneous buffer descriptor memory 306 and a bus interface 308. The system 300 as illustrated in FIG. 3 may further comprise a send data initiator 310, a read direct memory access (RDMA) processor 312 and a send data complete (SDC) module 314.

The send data initiator module 310 may comprise pre-DMA processing block 318, a first selector 320, a second selector 322, a DMA control register 324, a command register (Cmd Reg) 326 and a mode register 340. The pre-DMA processing block 318 may utilize information in the buffer descriptor information block 316 acquired from MISC_BD_MEM 306 for pre-DMA processing. The information from the MISC_BD_MEM 306 is collectively referenced as 316 and may comprise at least one of an address field, a length field, a flags field and an options field, for example. The mode register 304 may comprise, for example, a TCP segmentation enable bit (T) and a debug enable bit (D). The T bit may be utilized to enable hardware processing of LSO data packets received from the computing device's memory. If the T bit is disabled, firmware processing of large send offload packets may be initiated. At least one of the length and the flag fields may be utilized to indicate that a packet is a large send offload packet that is to be hardware or firmware processed. Firmware processing refers to CPU processing.

The multiplexer 322 may be adapted to select between pass through processing, hardware processing and firmware processing. Hardware processing may be achieved by pre-DMA processing block 318 and firmware processing may be achieved via the internal CPU (Int CPU) 302. In pass through processing, if it is determined that a packet is not a large send offload packet, the packet is passed directly to the read DMA processor 312 for processing. Those packets that may be determined to be large send packets are firmware or hardware processed.

In accordance with an embodiment of the invention, the read DMA processor 312 may be configured to facilitate hardware and/or firmware TCP segmentation offload. The read DMA processor 312 may comprise a read DMA engine 328, read DMA post-processing block 330 and mode register 342. Subsequent to post-DMA processing, one or more bits in a register such as a direct memory access descriptor (DMAD) register 334 may be configured. TCP/IP/UDP header and other data block 332 may be utilized for RDMA post-DMA processing and may be utilized to store at least a header for a first LSO segmented packet. In this regard, the header information for subsequently segmented packets for the LSO segmented packets may reuse at least a portion of the information stored in the TCP/IP/UDP header and other data block 332. The read DMA post-processing 330 may include suitable processing circuitry and/or logic that may be adapted to calculate checksum information in hardware and to format the header to segmented LSO packets.

The TXMBUF memory module 304 may be adapted to store information related to packets residing in the host memory 122 that was previously offloaded and segmented. The TXMBUF memory module 304 may comprise a number of memory partitions or memory storage locations dedicated to storing packets that conform to the maximum transmission unit (MTU) or maximum segment size (MSS) specifications of the host system 120. In an exemplary embodiment of the invention, the number of TXMBUF sections in the TXMBUF memory module 304 may comprise 64 TXMBUF sections with each TXMBUF section comprising, for example, 128 bytes. The TXMBUF memory module 304 may be adapted to store data payloads that conform to the maximum transmission unit (MTU) limits designated by the host system 120. The maximum transmission unit size may be 1518 bytes, for example. The TXMBUF memory module 304 may also store data associated with non processed packets that conform to the MTU requirements of the host system 112.

The send data complete module 314 may comprise send data complete post-processing block 336, which may include suitable circuits and/or logic that may be adapted to calculate a checksum and/or otherwise format the header. The send data complete module 314 may be adapted to processes information provided by the read DMA processor 312 to generate one or more address pointers used to indicate the start of the one or more packets or frames of data used to transmit the data from the host system 120 of FIG. 1.

In operation, referring to FIG. 3A, the send data initiator module 310 may be adapted to fetch a buffer descriptor (BD) from the miscellaneous buffer descriptor memory (MISC_BD_MEM) 306. One or more buffer information bits may be read and/or altered based on the fetched buffer descriptor. If it is determined that the packet is a large send offload packet and is to be segmented, then it may be pre-DMA processed in hardware by the pre-DMA processing block 318 or it may be processed in firmware by the internal CPU 302 and the send data initiator module 310. If it is determined that the packet is not a LSO packet, the selector 322 may be configured to pass the packet through to the read DMA processor 312 without any pre-DMA processing in occurring in the send data initiator module 310. One or more bits may be set and/or cleared in the DMA control register 324 that may indicate to the read DMA processor 312 the type of processing that is to be done on the packet.

In accordance with an embodiment of the invention, the length of a packet as indicated by the buffer descriptor length field may be determined. If the length of the packet indicates that the packet of over a specified length, then the packet may be pre-DMA processed for TCP segmentation. In an exemplary embodiment of the invention, any packet over, for example, 1500 bytes may be regarded as a large send packet. Accordingly, any packet received for processing that is over 1500 may be pre-DMA processed in hardware or firmware processed. In the case of packets that may be smaller 1500 bytes, the internal CPU 302 may configure the selector 322 so that the packet passes through the send data initiator 310 directly to the read DMA processor 312 for processing. Accordingly, a packet that may be less than 1500 bytes, for example, may be processed as a single un-segmented frame. The read DMA engine may then DMA the packet from the host memory 122 of FIG. 1 via the bus interface 308. In accordance with an embodiment of the invention, the length of a packet that may be regarded as a large send offload packet may be configurable.

After packets are processed, the read DMA processor 312 may transmit the non-LSO data packets and processed LSO data packets or payloads into the TXMBUF memory, for subsequent transmission from network interface card 116 of the host system to the local area network or wide area network. In this regard, processed packets may be queued for transmission over a physical medium by a medium access controller (MAC) device.

Figure 3B:
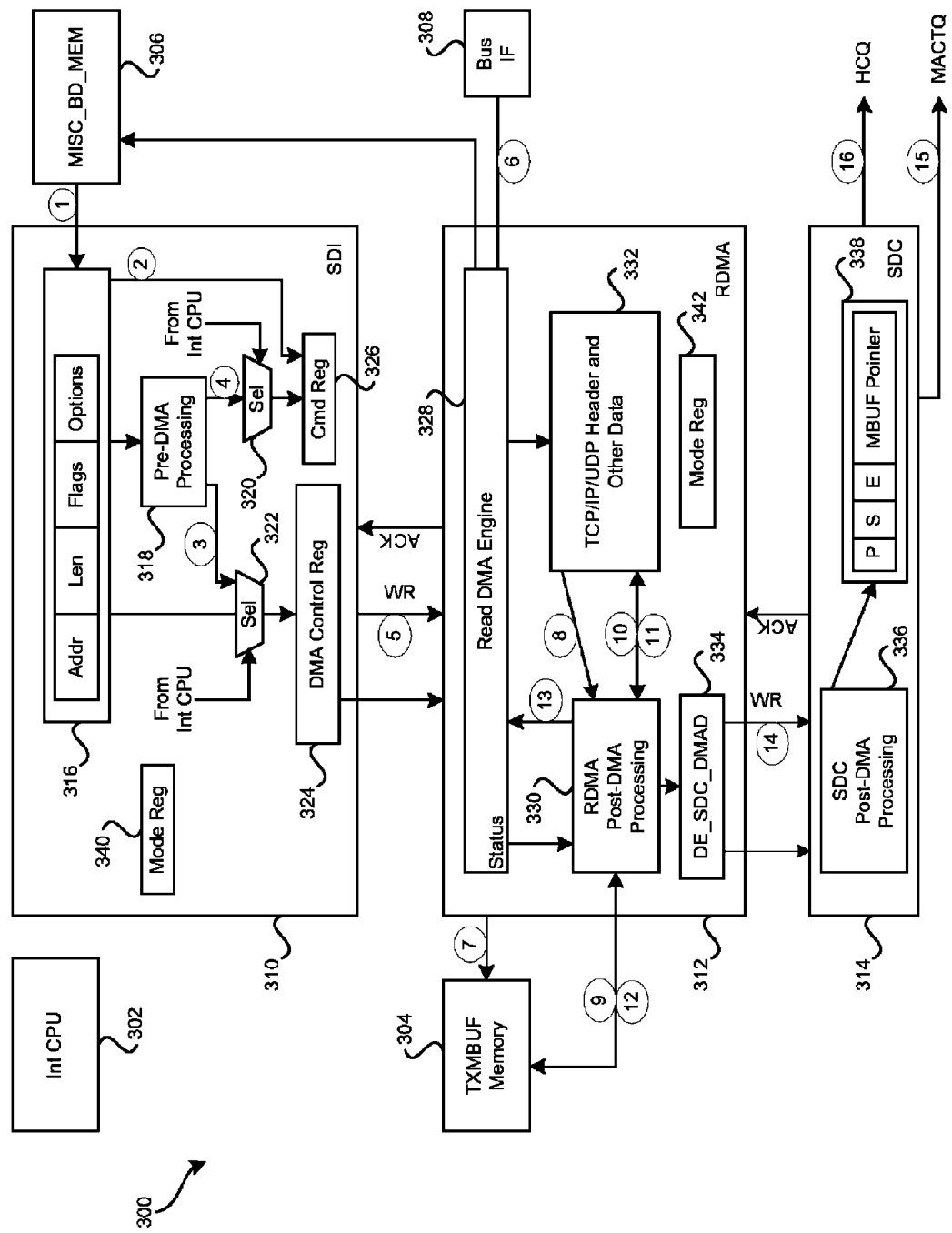
FIG. 3B further illustrates exemplary processing steps that may be utilized for segmentation of large send packets utilizing the system of FIG. 3A, in accordance with an embodiment of the invention.

FIG. 3B further illustrates exemplary processing steps that may be utilized for segmentation of large send packets utilizing the system 300 of FIG. 3A, in accordance with an embodiment of the invention. FIG. 3B is similar to FIG. 3A, but FIG. 3B further illustrates the exemplary processing steps referenced with circled numbers. Referring to FIG. 3B, in step 1, the send data initiator module 310 may be adapted to fetch a buffer descriptor (BD) from the miscellaneous buffer descriptor memory (MISC_BD_MEM) 306. In general, one or more buffer information bits may be read and or altered based on the fetched buffer descriptor. If it is determined that the packet is a large send offload packet and is to be segmented, then it may be pre-DMA processed in hardware by the pre-DMA processing block 318 or it may be processed in firmware by the internal CPU 302 and the send data initiator module 310. If it is determined that the packet is not a large send offload packet, the selector 322 may be configured to pass the packet through to the read DMA processor 312 without any pre-DMA processing in occurring in the send data initiator module 310. One or more bits may be set and/or cleared in the DMA control register 324 that may indicate to the read DMA processor 312 the type of processing that is to be done on the packet.

For a large send offload packet that is to be processed, in step 2, one or more bits such as a "PASS" or P bit in the command register (Cmd Reg) 326 may be cleared if a flag such as a "PRE_DMA" flag in the flags field of the buffer descriptor information 316 is set. In step 3, the send data initiator module 310 may configure one or more bits in the DMA control register 324 when the internal CPU 302 enables the selector 322. In step 4, the send data initiator module 310 may update the command register 326 when the internal CPU 302 enables the selector 320. In step 5, the send data initiator 310 may then issue a signal such as an SDI_DR_WR or WR signal request to the read DMA processor 312. A corresponding acknowledgement may sent from the read DMA processor 312 received by the send data initiator module 310.

Upon receiving, for example, the SDI_DR_WR or WR request, the read DMA engine 328 may initiate a DMA transfer of the TCP segmented data via the bus interface 308. In step 7, the read DMA engine 328 may move data to the transmit buffer (TXMBUF) memory 304. In step 8, the read DMA engine 328 may pass at least a checksum and header offset information, for example, to its post-DMA processing block 330 for post-processing. In step 9, the post-DMA processing block 330 may read in the packet protocol header from the TXMBUF memory 304 based on the RDMA engine status and header offset information contained in the TCP/IP/UDP header and other data block 332.

In step 10, the post-DMA processing block 330 may extract header information into its local registers from the TCP/IP/UDP header and other data block 332 in order to process the packet. In step 11, the post-DMA processing block 330 may modify the protocol header based on the header info registers. In this regard, in accordance with an aspect of the invention, for a first segment of a large sent offload packet, the header information for the large send offload packet is initially stored in the TCP/IP/UDP header and other data block 332. Accordingly, for subsequently received segments for the same large send offload packet, at least some of the header data stored in the TCP/IP/UDP header and other data block 332 is reutilized and appended to the segmented offloaded packets. This may significantly reduce processing time since no additional processing resources need to be tied up generating completely new headers. This is reduction in processing time may be significant in instances where the large send offload packets are of the order of, for example, 64 Kbytes, which may require about 40 segments.

In step 12, the post-DMA processing block 330 may copy modified protocol header to the TXMBUF and update data in the TXMBUF memory 304. In step 13, the post-DMA processing block 330 may inform the read DMA engine 328 that packet processing is complete. In step 14, the post-DMA processing block 330 may issue an indication such as a DMA read SDC write (DR_SDC_WR) request to the send data complete module 314. In response to the SDC write request, the send data complete module 314 may issue a corresponding acknowledgement (ACK). In step 15, the send data complete module 314 may issue an indication such as an SDC MAC transmit queue write (SDC_MACTQ_WR) request to a MAC transmit queue (MACTQ). In step 16, the send date complete module 314 may issue, for example, a SDC host coalescing queue write (SDC_HCQ_WR) request to a host coalescing queue (HCQ) when, for example, an end of fragment bit E is also set in the send data complete command register (SDCCR) 338.

Figure 4:
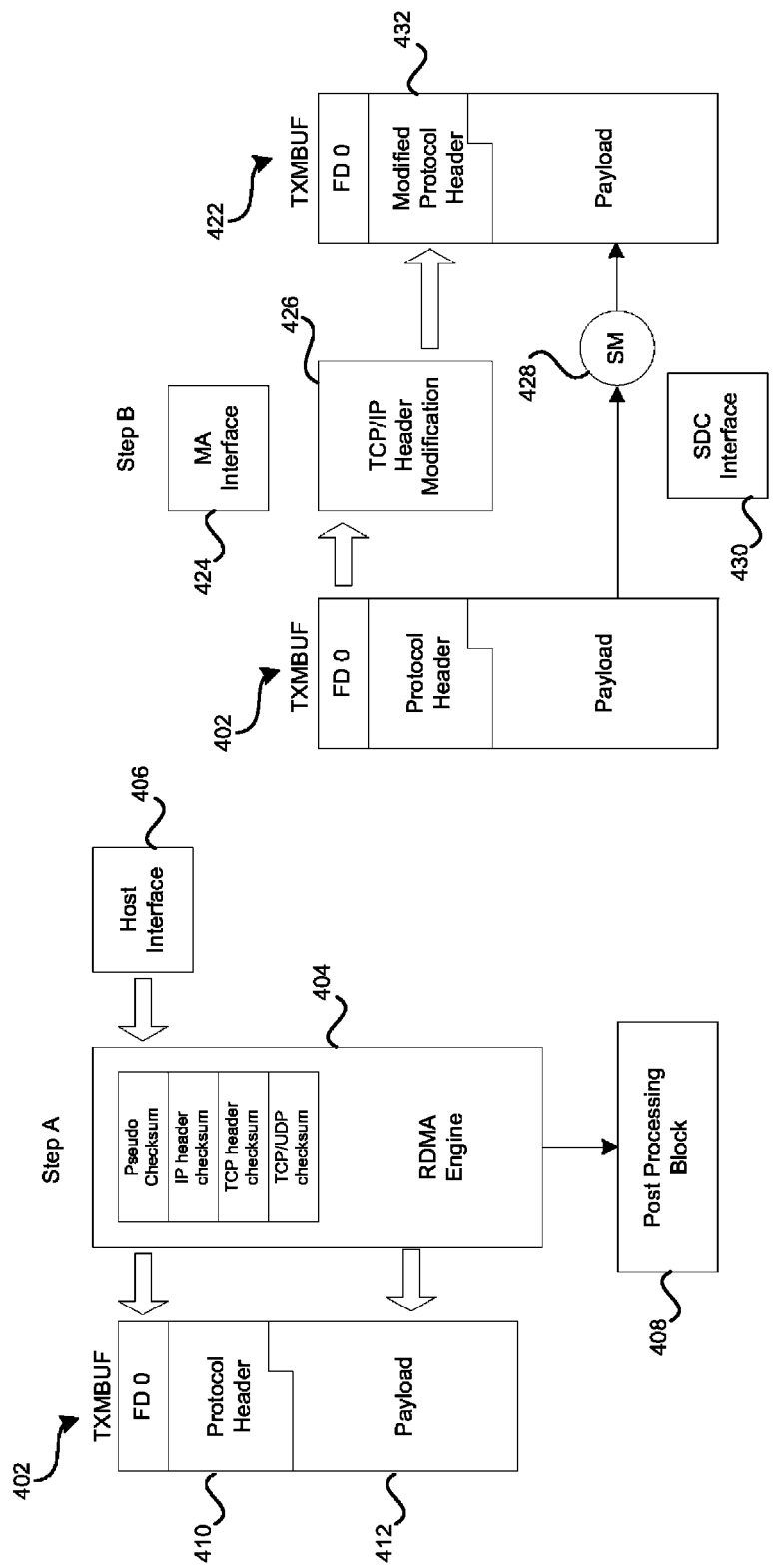
FIG. 4 is a block diagram illustrating state machine post-DMA processing of a first segment of a large send offload packet in accordance with an embodiment of the invention.

FIG. 4 is a block diagram illustrating state machine post-DMA processing of a first segment of a large send offload packet in accordance with an embodiment of the invention. FIG. 4 comprises a first step A which illustrates a transmit buffer (TXMBUF) 402 for a first segmented offload packet, a read DMA engine 404, a host interface or bus interface 406 and a post-processing block 408. The transmit buffer 402 comprises a frame descriptor which illustrates a first frame descriptor FD 0, a protocol header 410 and a payload 412. The payload may comprise at least a portion of what would otherwise be the protocol header 410.

In operation, in step A, the read DMA engine may DMA in the header for the first offload segment via the host interface 406. A minimal amount of the header information may be modified to enhance performance. This minimal of information may include, for example, at least one of a pseudo checksum, an IP header checksum, a TCP header checksum and a TCP/UDP header checksum. For the first segment, the read DMA engine protocol may modify the header information and write the modified header information and payload information into the transmit buffer 402. The read DMA engine 404 may also pass information, for example, a packet count to the post-processing block 408.

With regard to step B of FIG. 4, there is illustrated the transmit buffer 402 prior to header update or modification and an updated transmit buffer 422 after modification. Step B also shows a memory arbiter or memory arbitration module interfaces block 424, a TCP/IP header modification block 426, a state machine (SM) block 428 and a send data complete block interfaces block 430.

In operation, in step B, during post-processing, the state machine 428 may read header information from the transmit buffer 402 for the first segment indicated by frame descriptor FD 0. The state machine 428 may modify at least some of the header information read from the transmit buffer for the first segment. The modified header information is then placed into the transmit buffer 422 for the first segment. The state machine 428 may utilize the memory arbiter interfaces block 424 and the send data initiator interfaces block 430 to update the transmit buffer 422. Reference 432 illustrates the modified protocol header 432.

Figure 5:
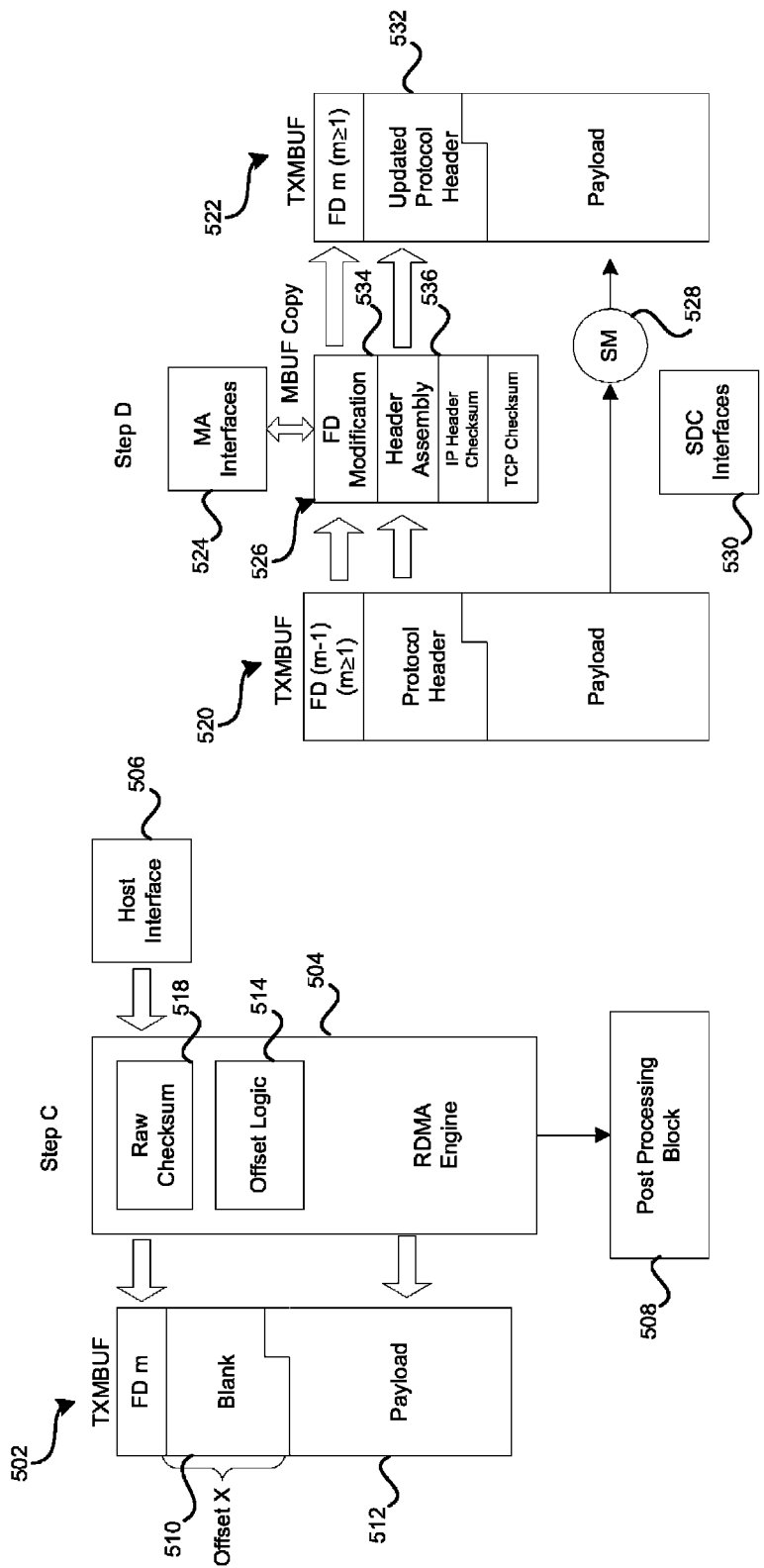
FIG. 5 is a block diagram illustrating further state machine post-DMA processing of subsequent segments of a large send offload packet in accordance with an embodiment of the invention.

FIG. 5 is a block diagram illustrating further state machine post-DMA processing of subsequent segments of a large send offload packet in accordance with an embodiment of the invention. FIG. 5 comprises a first step C which illustrates a transmit buffer (TXMBUF) 502 for a subsequent segmented offload packet m where m≦0, a read DMA engine 504, a host interface or bus interface 506 and a post-processing block 508. The transmit buffer 502 comprises a frame descriptor which illustrates the subsequent frame descriptor FD m, a protocol header 510 with offset X and a payload 512. The payload may comprise at least a portion of what would otherwise be the protocol header 510.

The read DMA engine 504 may comprise a raw checksum block 514 and an offset logic block 518. Since the frame FD m is subsequent to the first offload segment and the prior segment information was previously stored, the segment protocol header portion 510 may be blank. Accordingly, the offset logic block 518 in the read DMA engine 504 may be adapted to determine the offset X and the read DMA engine 504 may place the payload 512 at a location corresponding to the offset X in the transmit buffer 502. This may significantly reduce the amount of memory space that is required and also reduces processing time since there is no need to keep processing and storing the header for each subsequent offload segment. The read DMA engine 504 may therefore, DMA data for subsequent TCP offload segment and place the DMA'd data at the offset without calculating a header for the subsequent segmented offload packet.

In step D, the modification of the frame buffer descriptor is illustrated. In step D, there is illustrated a first transmit buffer 520, a second transmit buffer 522, memory arbitration interfaces block 524, send data complete interfaces block 530, state machine block 528, frame descriptor modification processor 534 and header assemble process 535. The transmit buffer 520 is for an immediately previously processed offload segment indicated by frame descriptor FD (m−1) where m≧1. Hence, if transmit buffer 502 is utilized for the second segmented offload packet and m=1, then transmit buffer 520 represents the first transmit buffer represented by the frame descriptor FD (1−1) or FD 0. Similarly, if transmit buffer 502 is utilized for the third segmented offload packet and m=2, then transmit buffer 520 represents the second transmit buffer represented by the frame descriptor FD (1−1) or FD 1. Therefore, the second transmit buffer 522 is a transmit buffer that is utilized for the offload segment that follows the offload segment represented by the buffer descriptor 520.

In operation, the frame modification processes may comprise reading the frame descriptor for an immediately prior offloaded segment, and modifying protocol header information such as the IP header checksum and the TCP checksum, for example. In this regard, the header assembly block 536 may assemble a resulting modified header information and the modified information may be placed in the protocol header portion 532 of the current transmit buffer for the frame descriptor FD m. The state machine 528 may update the payload portion of the transmit buffer indicated by the frame descriptor FD m via the memory arbiter interfaces block 524 and the send data complete interfaces block 530.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing packets, the method comprising:
   performing by a plurality of processors integrated in a single NIC chip, said plurality of processors comprising at least a hardware processor and a firmware processor:
      receiving information identifying at least one packet to be processed and determining whether said identified packet is a large send offload packet; and
      if said identified packet is a large send offload packet, selecting between at least said hardware processor and said firmware processor to process said large send offload packet.

2. The method according to claim 1, comprising if said identified packet is not a large send offload packet, bypassing said hardware processor and said firmware processor, and read DMA processing said identified packet from a host memory.

3. The method according to claim 1, comprising computing at least one checksum for said identified packet in hardware during read DMA processing.

4. The method according to claim 3, comprising generating in said hardware during said read DMA processing, at least one header for packet segments corresponding to said large send offload packet.

5. The method according to claim 1, comprising computing at least one checksum for said identified packet in firmware during send data complete processing.

6. The method according to claim 1, comprising generating in said firmware during said send data complete processing, at least one header for packet segments corresponding to said large send offload packet.

7. The method according to claim 1, comprising storing at least a portion of protocol header information for a first segment of said large send offload packet.

8. The method according to claim 7, comprising utilizing at least a portion of said stored protocol header information for at least a header portion of a second segment of said large send offload packet.

9. The method according to claim 8, comprising placing a payload corresponding to said second segment of said large send offload packet at a determined offset within a transmit buffer for said second segment.

10. The method according to claim 9, comprising creating a header portion of said second segment based on at least a header portion of a previous segment.

11. A network interface system comprising:
    a plurality of processors, wherein said plurality of processors comprises at least a hardware processor and a firmware processor, and wherein said plurality of processors receives information identifying at least one packet to be processed and determines whether said identified packet is a large send offload packet; and
    if said identified packet is a large send offload packet, said plurality of processors selects between at least said hardware processor and said firmware processor to process said large send offload packet.

12. The system according to claim 11, wherein said plurality of processors enable bypassing said hardware processor and said firmware processor, and read DMA processing said identified packet from a host memory, if said identified packet is not a large send offload packet.

13. The system according to claim 11, wherein said plurality of processors enable computing at least one checksum for said identified packet in hardware during read DMA processing.

14. The system according to claim 13, wherein said plurality of processors enable generating in said hardware during said read DMA processing, at least one header for packet segments corresponding to said large send offload packet.

15. The system according to claim 11, wherein said plurality of processors enable computing at least one checksum for said identified packet in firmware during send data complete processing.

16. The system according to claim 15, wherein said plurality of processors enable generating in said firmware during said send data complete processing, at least one header for packet segments corresponding to said large send offload packet.

17. The system according to claim 11, wherein said plurality of processors enable storing at least a portion of protocol header information for a first segment of said large send offload packet.

18. The system according to claim 17, wherein said plurality of processors enable utilizing at least a portion of said stored protocol header information for at least a header portion of a second segment of said large send offload packet.

19. The system according to claim 17, wherein said plurality of processors enable placing a payload corresponding to said second segment of said large send offload packet at a determined offset within a transmit buffer for said second segment.

20. The system according to claim 19, wherein said plurality of processors enable creating a header portion of said second segment based on at least a header portion of a previous segment.

* * * * *